US010884526B2

(12) United States Patent
Chang

(10) Patent No.: US 10,884,526 B2
(45) Date of Patent: *Jan. 5, 2021

(54) TOUCH SENSITIVE INFORMATION TRANSMISSION METHOD, PROCESSOR AND SYSTEM

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/597,240

(22) Filed: Oct. 9, 2019

(65) Prior Publication Data

US 2020/0042115 A1 Feb. 6, 2020

Related U.S. Application Data

(63) Continuation of application No. 14/706,186, filed on May 7, 2015, now Pat. No. 10,481,707.

(60) Provisional application No. 61/989,658, filed on May 7, 2014.

(51) Int. Cl.
G06F 3/041 (2006.01)

(52) U.S. Cl.
CPC ........... *G06F 3/041* (2013.01); *G06F 3/0416* (2013.01); *G06F 2203/04108* (2013.01)

(58) Field of Classification Search
CPC .................. G06F 3/041; G06F 3/0416; G06F 2203/04108
See application file for complete search history.

(56) References Cited

U.S. PATENT DOCUMENTS

| 8,976,153 | B2 | 3/2015 | Toda et al. |
| 9,489,084 | B2 | 11/2016 | Liu |
| 2011/0084928 | A1 | 4/2011 | Chang et al. |
| 2013/0106774 | A1 | 5/2013 | Radivojevic et al. |
| 2013/0271396 | A1 | 10/2013 | Chen et al. |
| 2015/0153803 | A1* | 6/2015 | Tokutake ............. G06F 1/3206 713/323 |

* cited by examiner

*Primary Examiner* — Nelson M Rosario
(74) *Attorney, Agent, or Firm* — WPAT, PC

(57) ABSTRACT

The present application provides a touch sensitive information transmission method, comprising: correcting a gradient phenomenon of at least one line piece of a first electrode to filter noises; transmitting the sensing information of the at least one line piece, wherein the at least one line piece includes a plurality of signal values accumulated from a plurality of difference values with the noises, the plurality of signal values has the gradient phenomenon with regard to the accumulated noises; and detecting the sensing information of a second electrode while the transmitting step is being executed simultaneously.

14 Claims, 9 Drawing Sheets

TOUCH SENSITIVE INFORMATION TRANSMISSION METHOD, PROCESSOR AND SYSTEM

CROSS REFERENCE TO RELATED APPLICATIONS

This application is a continuation of U.S. patent application Ser. No. 14/706,186, filed on May 7, 2015, which claims priority under 35 U.S.0 119 to U.S. provisional patent application, 61/989,658, filed on May 7, 2014, the disclosure of which is incorporated herein by reference.

BACKGROUND OF THE INVENTION

1. Field of the Invention

The present invention relates to touch method, processor and system, and more particularly, to touch sensitive information transmission method, processor and system.

2. Description of the Prior Art

In prior art, the hardware or firmware of the touch detection information must transmit the detection results for whole screen, that is, to transmit all sensitive information of all sensing electrodes 110. This process does not only transmit excessive information and waste a lot of transmission sources, but also requires the receiver to analyze each line piece mentioned above to find the corresponding proximity event.

SUMMARY OF THE INVENTION

One objective of the present application is to provide a touch sensitive information transmission method, comprising: transmitting the sensing information of at least one line piece of a first electrode; and detecting the sensing information of a second electrode.

One objective of the present application is to provide a touch sensitive information transmission processor, executing the following steps: transmitting the sensing information of at least one line piece of a first electrode; and detecting the sensing information of a second electrode.

One objective of the present application is to provide a touch sensitive information transmission method, comprising: detecting a plurality of line pieces; and transmitting a plurality of sensing information included by the plurality of line pieces according to a sequence.

One objective of the present application is to provide a touch sensitive information transmission processor, executing the following steps: detecting a plurality of line pieces; and transmitting a plurality of sensing information included by the plurality of line pieces according to a sequence.

One objective of the present application is to provide a touch sensitive information transmission system, comprising: a transmitter, detecting and transmitting sensing information of at least one line piece; and a receiver, receiving the sensing information of the at least one line piece.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
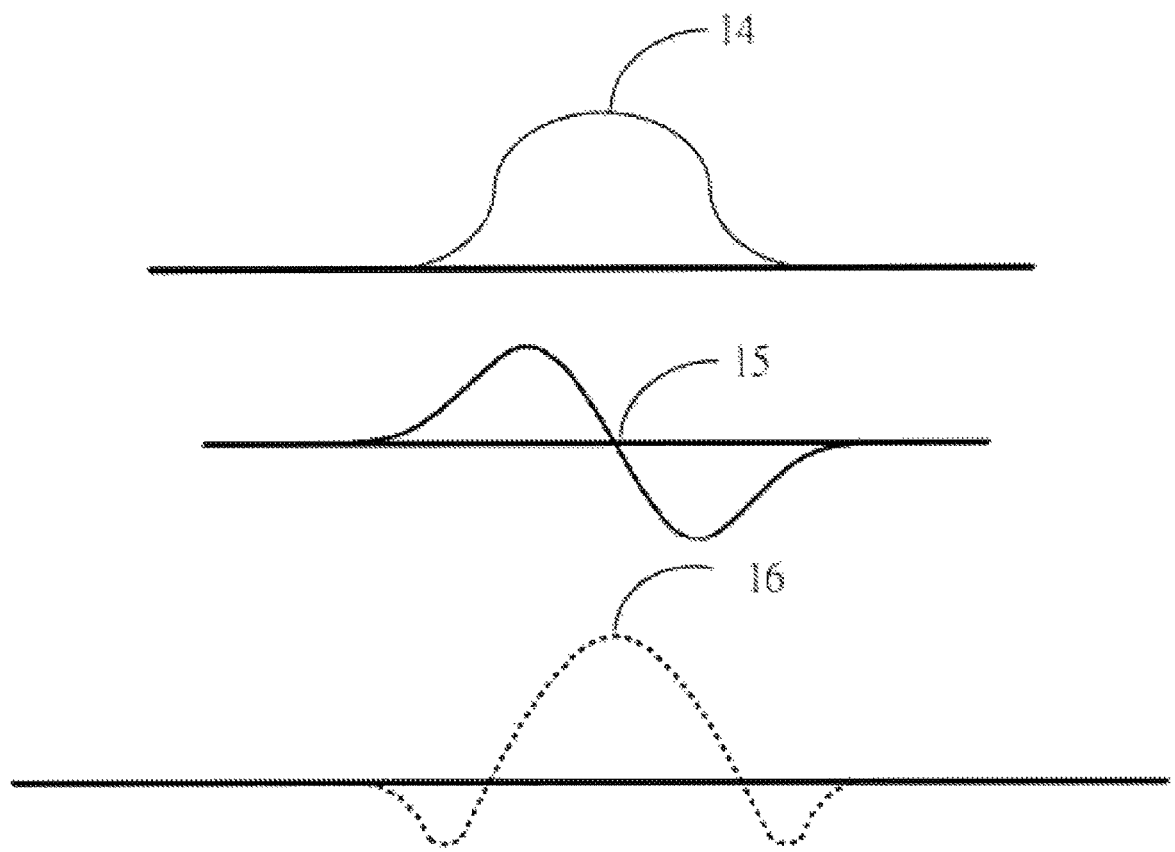
FIG. 1 depicts a diagram of signal values, difference values, and dual difference values in accordance with an embodiment of the present application.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

For convenience, explanations of some terms are provided below. Scope of the present application includes but not limits to the following simple explanations.

Touch Panel/Screen: A sensing layer is formed on a substrate, and its control device is capable of detecting the position of at least one conductive object approaching or touching the substrate using the sensing layer. The sensing layer may be a single-layered or multi-layered structure.

Approaching/Touching: Approaching, approximating or touching.

External Conductive Object: It can be a part of the human body, such as a finger or a palm, or an object in connection with the human body, such as a passive stylus. It can also be an active stylus which emits signals to enable a touch panel to detect the position itself. It can also be a grounded testing conductive object, such as a copper cylinder. It can also be water or conductive liquid retained on the surface of a touch panel.

Approaching/Touching Object: An external conductive object that is approaching or touching a substrate.

Approaching/Touching Event: An event of an external conductive object detected by a touch panel when the external conductive object is approaching or touching a substrate.

Sensing Layer: It includes a plurality of (m) driving electrodes parallel to a first axis and a plurality of (n) sensing electrodes parallel a second axis. The driving electrodes and the sensing electrodes are exposed from one another, forming m times n sensing points. The first axis and the second axis may be perpendicular to each other, and m can equal to n.

Driving Electrode (First Conductive Strip): A plurality of (m) electrodes which are parallel to the first axis are used to transmit driving signals. They can be made of transparent or opaque material such as Indium Tin Oxide (ITO) or carbon nanotubes. It can be a single-layered or multi-layered structure.

Sensing Electrode (Second Conductive Strip): Electrodes used for detecting capacitive signals. It can be made of transparent or opaque material such as Indium Tin Oxide (ITO) or carbon nanotubes. It can be a single-layered or multi-layered structure.

One-dimensional Sensing Information: A plurality of sensing information corresponding to a first axis or a second axis. It may indicate a collection of signal values of m sensing points of m driving electrodes corresponding to a single sensing electrode. It may also indicate a collection of signal values of n sensing points of n sensing electrodes corresponding to a single driving electrode. In other words, one-dimensional sensing information may include signal values of m sensing points, or signal values of n sensing points. One-dimensional sensing information may also include single difference values or dual difference values of m/n sensing points.

Two-dimensional Sensing Information: Sensing information formed by combining a plurality of one-dimensional sensing information. It can also be called an image.

Baseline or Stray: A signal value corresponding to a specific working frequency.

Signal Value: It can be a signal directly detected by a sensing electrode or a signal value restored from a single difference value or a dual difference value, although these two value may not be the same, they are interchangeable in some embodiments.

Single Difference Value (or simply Difference): The difference in signals values between adjacent sensing points.

Dual Difference Value: The difference between adjacent difference values.

Line Piece: All or a continuous part of one-dimensional sensing information.

Line Piece Group: A plurality of line pieces corresponding to adjacent one-dimensional sensing information, and there is at least one pair of neighboring sensing points on adjacent axes.

Ghost Point: A point or region corresponding to an unwanted capacitive sensing.

There are three processes in the operations of a touch panel/screen. One is a full screen driving detection process, in which the existence of at least one approaching/touching object can be determined by simultaneously providing driving signals to all of the driving electrodes. The second one is an external noise detection process, in which the supplying of driving signals to all of the driving electrodes is stopped to determine if an external electromagnetic interference is severe. The third one is a touch point reporting process, in which driving signal is sequentially provided to each of the driving electrodes, and then touch points and/or related information are reported to other software or hardware based on signal values detected or read by each of the sensing electrodes.

In an embodiment, the order in which the above three processes are executed is that the full screen driving detection process is first executed to make sure there is no external conductive object on the touch panel/screen, then the external noise detection process is executed to make sure the external electromagnetic interference is not severe or to set a new working frequency of driving signal, and finally the touch point reporting process is executed.

In one embodiment, after the touch point reporting process, the above processes are iterated.

In another embodiment, after several iterations of the touch point reporting process are performed, the external noise detection process is executed once, and then several iterations of the touch point reporting process are again followed by one external noise detection process. After the external noise detection process is performed several times, the full screen driving detection process is then executed.

One with ordinary skill in the art can appreciate that there are infinite number of combinations of the executions of the above three processes, and the present invention is not limited to a particular combination. The order of executions can be determined in advance, or can be altered on the fly depending on the situations encountered, or the execution of a specific process is decided on the fly.

In general, the objectives of the touch point reporting process are to detect a pen touch and/or a fingertip approaching/touching the touch panel/screen, and to eliminate palms and water (a combinational representation of conductive liquid, referred to as water hereinafter) or unwanted capacitive sensing. The touch point reporting process may further include and be divided into the following steps: scanning or detecting all sensing points; making adjustment based on the electrical characteristics of the sensing electrodes and the curvature of the substrate; determining at least one line piece corresponding to each of the above objects; examining every line piece to eliminate water and ghost points; combining eligible line piece(s) into a line piece group to eliminate palms; positioning a pen touch and/or fingertip(s); tracking positions or tracing; and reporting the position(s). Although the touch point reporting process can include every one of the above steps, but not every step is necessary, and some may be bypassed.

In general, a processing module of a touch panel/screen can obtain m lines of one-dimensional (1D) sensing information detected by every sensing electrode. Each line of 1D sensing information includes n pieces of information corresponding to the sensing points of respective driving electrodes. The processing module may obtain signal values directly, or obtain difference values directly. When signal values are obtained, difference values of these signal values can be calculated. When difference values are obtained, signal values can be derived through the baseline. Then, dual difference values can be further calculated regardless whether 1D sensing information of signal values or difference values are obtained.

Referring to FIG. 1, the topmost curve 14 indicates signal values; the middle curve 15 indicates difference values; and the bottommost curve 16 indicates dual difference values.

In optional steps, owing to the electrical characteristics of the sensing electrodes, signal value detected by each sensing point may have some deviations that can be adjusted. In addition, since the substrate may be bent as a result of an approaching/touching event, the substrate itself may be deformed. Thus, the effect of the deformation of the substrate can also be adjusted.

The step of determining a line piece using an 1D sensing information can include finding the range of the line piece using dual difference values, difference values and/or signal values. Once the dual difference values are obtained, there are several ways to extract the line pieces.

Figure 2A:
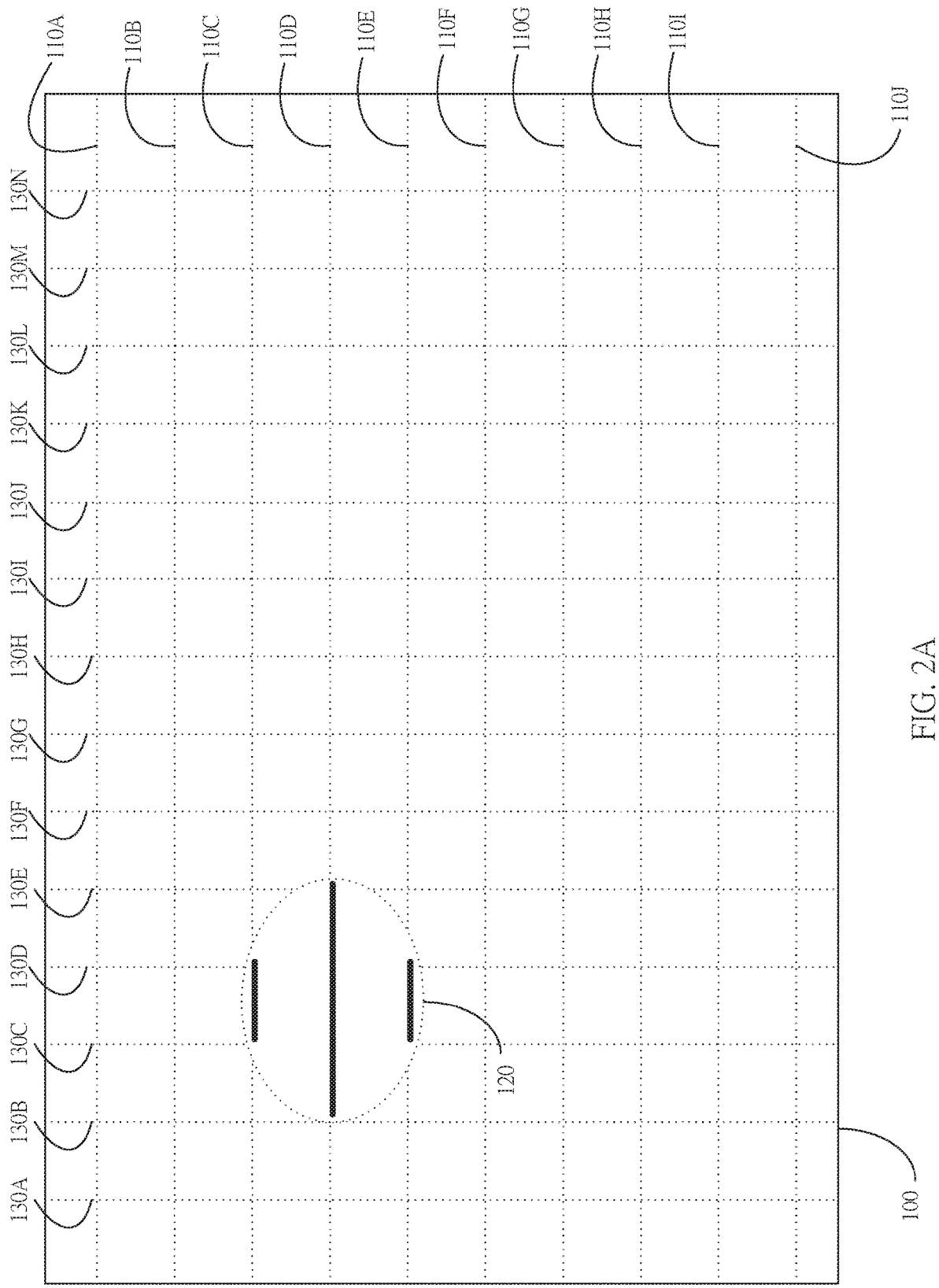
FIG. 2A depicts a diagram of a line piece detection in accordance with an embodiment of the present application.

Please refer to FIG. 2A, a line piece detection based on signal values for one embodiment in accordance with the present invention is illustrated. A touch panel/screen 100 has a lot of driving electrodes 110A~110J (first conductive strips) and a lot of sensing electrodes 130A~130N (second conductive strips). After touching detection, the detection results might not include any line piece relating to proximity event, or might include at least one line piece relating to at least one proximity event. For example, the instance in FIG. 2A, it shows one proximity event, 120.

When the driving electrode 110A is driven, a signal value of each sensing point of the driving electrode 110A could be determined by detecting all sensing electrodes 130A~130N by capacitively coupling. At this time, the signal value of each sensing point should be zero (after subtracting the baseline or the stray) because no approaching/touching object is approaching or touching the driving electrode 110A. Likewise, the signal value of each driving electrode should be zero, too. When the driving electrode 110C is driven so as to detect all sensing electrodes 130A~130N, the signal value of the 3rd sensing point of the driving electrode 110C corresponding to the sensing electrode 130C and the signal value of the 4th sensing point of the driving electrode 110C corresponding to the sensing electrode 130D will not be zero because an approaching/touching object is approaching or touching the driving electrode 110C. Thus, the signal values of the driving electrode 110C will form a line piece from the 3rd sensing point to the 4th sensing point.

Similarly, when the driving electrode 110D is driven, and all sensing electrodes 130A~130N are detected, the signal values of the 2nd, 3rd, 4th and 5th sensing points of the driving electrode 110D respectively corresponding to the sensing electrodes 130B, 130C, 130D and 130E will not be zero. Thus, the signal values of the driving electrode 110D will form a line piece from the 2nd sensing point to the 5th sensing point.

When the driving electrode 110E is driven, and all sensing electrodes 130A~130N are detected, the signal values of the driving electrode 110E will also form a line piece from the 3rd sensing point to the 4th sensing point.

In addition, there are several following ways to extract the line pieces based on One-dimensional Sensing Information.

In one embodiment, a "relative high point" higher than a dual difference threshold can be first determined. Then, a "relative low point" is found retrospectively (which is called a first point or a preceding point), and another "relative low point" is found prospectively (which is called a second point or a following point); the range of this line piece is from the first point to the second point. For example, there are 1D sensing information of n sensing points. A relative high point is found at the 20th point, a relative low point found retrospectively is at the 15th point, and another relative low point found retrospectively is at the 25th point; the range of this line piece is from the 15th point to the 25th point, and the length of the line piece is 11.

In another embodiment, when continuous positive signal values of a 1D sensing information can be determined, wherein the position of the first one of continuous positive signal values is called a first point, and the position of the last one of continuous positive signal values is called a second point, the range of this line piece is from the first point to the second point. For example, there are 1D sensing information of n sensing points. Continuous positive signal values are found from the 15th point to the 20th point. The range of this line piece is from the 15th point to the 25th point, and the length of the line piece is 11.

Figure 2B:
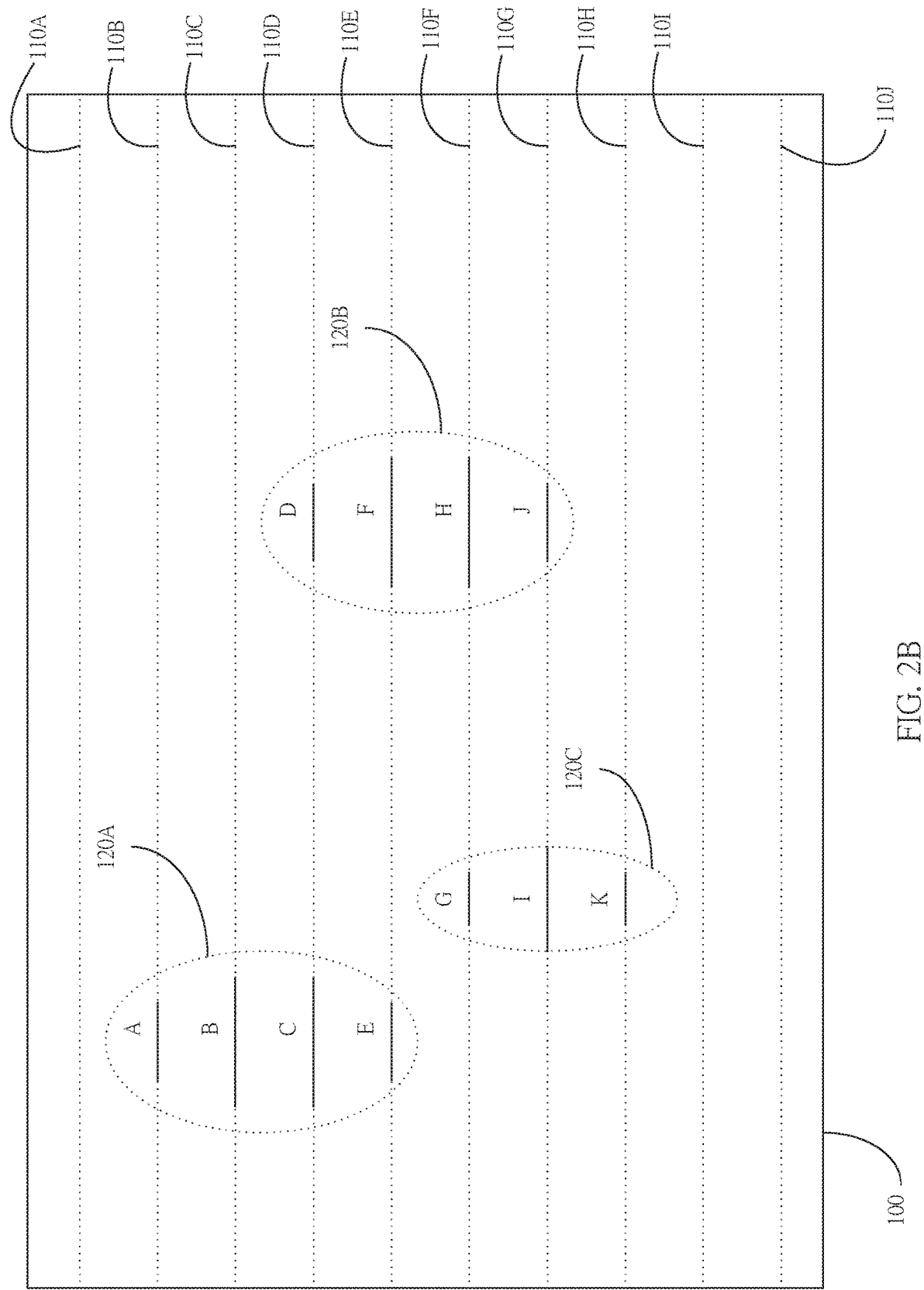
FIG. 2B depicts a diagram of a line piece detection in accordance with an embodiment of the present application.

Please refer to FIG. 2B, a line piece detection for one embodiment in accordance with the present invention is illustrated. A touch panel/screen 100 has a lot of sensing electrodes 110 (second conductive strips). After touching detection, the detection results might not include any line piece relating to proximity event, or might include at least one line piece relating to at least one proximity event. For example, the instance in FIG. 2B, it shows three proximity events, 120A, 120B, and 120C. The proximity event 120A includes four line pieces A, B, C, and E. The proximity event 120B includes four line pieces D, F, H, and J. The proximity event 120C includes three line pieces G, I, and K.

In prior art, the hardware or firmware of the touch detection information must transmit the detection results for whole screen, that is, to transmit all sensitive information of all sensing electrodes 110. This process does not only transmit excessive information and waste a lot of transmission sources, but also requires the receiver to analyze each line piece mentioned above to find the corresponding proximity event. Therefore, according to one embodiment of the present invention, it can only transmit the touch sensitive information of abovementioned line pieces to save the transmission resources and reduce the calculating resources of the receiver.

In one embodiment, the sensitive information for each line piece is transmitted according to the corresponding sequence of the first conductive strips or the second conductive strips on the line piece. For instance, the sequence could be from top to bottom, from left to right, that is, following the sequence of A, B, C, D, E, F, G, H, I, J, and K. In this embodiment, when line piece G is transmitted, the receiver will know the line pieces related to the proximity event 120A are completely transmitted, and can carry on the relating process corresponding to the proximity event 120A in advance.

In addition, the detection of the line pieces and the transmission of the sensing information of the line pieces could be executed respectively. For example, the sensing information of line piece A is transmitted (the detection of electrode 110B is completed), and the electrode 110C is detected simultaneously. Or the electrode 110C is detected after transmitting the sensing information of the line piece A. Or before transmitting the sensing information of the line piece A, the detection of multiple electrodes (e.g. electrodes 110A~110C) are completed, and the following electrodes 110D, 110E . . . is still being detected while transmitting the sensing information of line piece A.

Accordingly, the invention provides a touch sensitive information transmission method, comprising: transmitting sensing information of at least one line piece of a first electrode; and detecting sensing information of a second electrode. The first and second electrodes could be the electrodes 110B and 110C of FIG. 2B, respectively. In one embodiment, after transmitting the sensing information of the line piece A of the first electrode 110B, the second electrode 110C is detected to determine whether there is at least one line piece of the second electrode 110C or not. In another embodiment, the sensing information of the line piece A could be transmitted, and the second electrode 110C could be detected simultaneously.

The steps of the touch sensitive information transmission method could be iterated. That is to say, while at least one line piece is determined based on the sensing information of the second electrode, the sensing information of the at least one line piece of the second electrode could be transmitted, and the sensing information of a third electrode could be detected. For example, the third electrode could be the electrode 110D of FIG. 2B. While the line piece B is determined based on the sensing information of the second electrode 110C, the sensing information of the line piece B is transmitted, and the third electrode 110D could be detected simultaneously or in sequence.

In addition, when it is determined that there is no line piece based on the sensing information of the second electrode, the sensing information of the third electrode is still being detected. For example, the first, second and third electrodes are the electrodes 110H, 110I and 110J of FIG. 2B. When transmitting the sensing information of a line piece K of the first electrode 110H, the second electrode 110I could be detected simultaneously or later to determine whether there is at least one line piece. When it is determined that there is no line piece based on the sensing information of the second electrode 110I, the third electrode 110J is still being detected.

Furthermore, the detection of line piece and transmission of sensing information could be executed non-simultaneously. In other words, the frequencies or the periods of the detection and transmission could be different. For example, the transmission is executed once after detecting every three times. That is to say, after detecting the electrodes 110A~110C, the sensing information of line pieces A and B are transmitted. At this time, the electrodes 110D~110F are still being detected.

In another embodiment, the sensitive information for each line piece is transmitted according to the sequence of the proximity events related to the line pieces. If there are several proximity events, the sequence also could be from top to bottom, from left to right. In the instance shown in FIG. 1, the sequence for transmitting the proximity events is 120A, 120B, and 120C. Hence, the sequence for transmitting each line piece is A, B, C, E, D, F, H, J, G, I, and K. In this embodiment, when line piece D is transmitted, the receiver will know the line pieces related to the proximity event 120A is over, and can carry on the relating process corresponding to the proximity event 120A. When line piece G is transmitted, the receiver will know the line piece related to the proximity event 120B is over, and can carry on the relating process corresponding to the proximity event 120B in advance.

According to the above embodiments, the invention provides another touch sensitive information transmission method. First, a plurality of line pieces (all or part of line pieces) of the touch panel/screen 100 are determined. Then, the sensing information of the line pieces are transmitted according to a sequence. After obtaining the plurality of line pieces, the sensing information of the line pieces could be transmitted according to several sequences.

For example, all line pieces from the electrode 110A to the electrode 110J of FIG. 2B are determined first, and then the sensing information of the line pieces are transmitted respectively according to the sequence of A, B, C, E, D, F, H, J, G, I, and K. At this time, the sensing information are transmitted according to the sequence of the approaching/touching events. The touch sensitive information transmission method comprises: determining a plurality of approaching/touching events based on the plurality of line pieces, and setting a sequence of the plurality of approaching/touching events. Then, the sensing information of all line pieces of each approaching/touching event is transmitted according to the sequence of the plurality of approaching/touching events.

For example, a plurality of (all) line pieces A, B, C, D, E, F, G, H, I, J, and K are determined first, and a plurality of approaching/touching events 120A, 120B, and 120C are determined based on the plurality of line pieces. Then, according to the sequence of the driving electrode number and the sensing electrode number, the approaching/touching events 120A, 120B, and 120C are set as a first approaching/touching event 120A, a second approaching/touching event 120B, and a third approaching/touching event 120C in order. Thus, the sensing information of the line pieces could be transmitted according to the sequence of the first, second, and third approaching/touching events.

In one embodiment, the first approaching/touching event 120A comprises a plurality of first line pieces A, B, C, and E; the second approaching/touching event 120B comprises a plurality of second line pieces D, F, H, and J; and the third approaching/touching event 120C comprises a plurality of third line pieces G, I, and K. When transmitting the sensing information the plurality of first line pieces of the first approaching/touching event 120A, the sensing information could be transmitted according to the sequence of the electrode arrangement. That is to say, the sensing information of the first line pieces A, B, C, and E are transmitted in order. Similarly, the sensing information of the second line pieces D, F, H, and J are transmitted in order, and finally the sensing information of the third line pieces G, I, and J are transmitted in order. For another example, a plurality of (all) line pieces A, B, C, D, E, F, G, H, I, J, and K are determined first, and then the sensing information of all line pieces are transmitted according to the sequence of the electrode arrangement A, B, C, E, D, F, H, J, G, I, and K.

The plurality of line pieces mentioned above could be all line pieces or part of the line pieces of the touch panel/screen 100. For example, the transmission is executed once after detecting every three electrodes. In other words, after detecting the electrodes 110A~110C, or determining the plurality of line pieces (part of the line pieces) A and B, the sensing information of the corresponding line pieces are transmitted according to the sequence of the electrode arrangement. Then, after detecting the electrodes 110D~110F, or determining the plurality of line pieces C, D, E, F, G, and H the sensing information of the corresponding line pieces are transmitted according to the sequence of the electrode arrangement. The rest may be deduced by analogy.

In another embodiment, the present invention does not limit the transmission sequence. After all line pieces are transmitted completely, the receiver can piece up the information of whole screen.

The sensitive information of line piece(s) mentioned in the present invention can be detected by capacitive touch technology or by other touch technology, such as resistive touch technology. In the embodiment of capacitive touch technology, the sensitive information of the line piece(s) mentioned above can be generated by signal values, or generated by the difference value of two adjacent signal values, or generated by the difference value of difference value of three adjacent signal values (so-called dual-difference value.) The content of sensitive information is not limited by the present invention, and is generated by the sensing data.

Figure 3A:
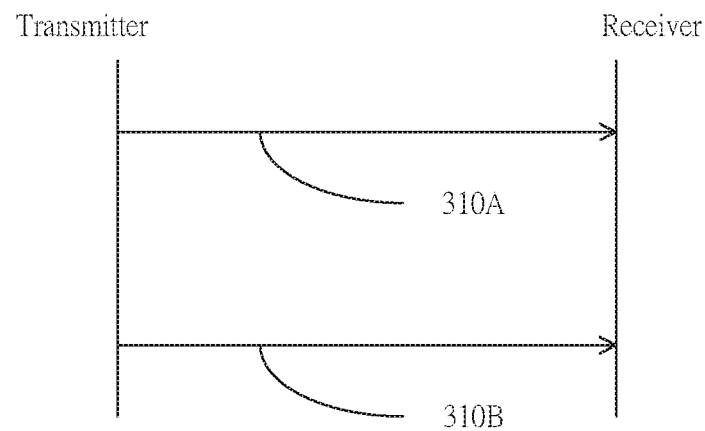
FIG. 3A depicts a diagram of a touch sensitive information transmission system in accordance with an embodiment of the present application.

Please refer to FIG. 3A, a flow chart for the transmitter and receiver in one embodiment in accordance with the present invention is illustrated. The transmitter at left side could be the hardware, firmware, or driver program and is in charge for detecting touch sensitive information. It is used to transmit the sensitive information according to the abovementioned embodiments. The receiver at the right side could be the application program, operation system, or driver program.

In every information transmission, the information for whole screen can be transmitted. For example, in step 310A shown in FIG. 3A, the touch sensitive information of the touch panel/screen 100 during some period can be transmitted. And then, in step 310B, the touch sensitive information of the touch panel/screen 100 during another period can be transmitted. The present invention does not limit the receiver whether to reply the confirming information or not.

In one embodiment, after receiving the sensing information of all line pieces of the touch panel/screen in a time interval, the receiver could execute the grouping procedure for all line pieces. For example, after transmitting the sensing information of the line pieces A, B, C, D, E, F, G, H, I, J, and K to the receiver, the receiver groups the line pieces A, B, C, and E into the approaching/touching event 120A; groups the line pieces D, F, H, and J into the approaching/touching event 120B; and groups the line pieces G, I, and K into the approaching/touching event 120C.

In another embodiment, after the transmitter groups the line pieces A, B, C, D, E, F, G, H, I, J, and K into the approaching/touching events 120A, 120B, and 120C, respectively, the line pieces are transmitted to the receiver. In addition, the sensing information of only one electrode could be transmitted each time. For example, in the step 310A of FIG. 3A, the sensing information of the line piece A of the electrode 110B could be transmitted. Then, in the step 310B, the sensing information of the line piece B of the electrode 110C could be transmitted.

In one embodiment, it is not necessary that the receiver groups all line pieces only after receiving the sensing information of all line pieces of whole screen in a time interval. Each time the receiver can group one or more line pieces of one electrode immediately after receiving the line pieces. For example, while the receiver receives the sensing information of the line pieces A and B respectively, the receiver can determine that the line pieces A and B are in the same group immediately. Then, while the receiver receives the sensing information of the line piece C and the line piece D of the electrode 110D, the receiver can determine that the line pieces A, B, and C are in the same group immediately, but the line piece D is in a different group. In other words, while the receiver receives the sensing information of the line pieces B, C, and D, the receiver determines the approaching/touching event corresponding to the line piece B of the electrode 110C, and determines the approaching/touching events respectively corresponding to the line pieces C and D of the electrode 110D. Accordingly, the line pieces B and D are determined in the same approaching/touching event, and the line piece D is determined in a different approaching/touching event.

In another embodiment, the transmitter could determine that the line pieces A, B, and C are in the same group, and the line piece D is in another group. Then, the transmitter transmits the sensing information of the line pieces C and D to the receiver.

When the sensing information is a signal value restored from difference values or dual difference values, the noises included by the difference values or dual difference values could be accumulated. Then, a gradient phenomenon with gradually increased or gradually decreased restored signal values could appear. Thus, the transmitter could correct the gradient of the sensing information of the line pieces, and then transmit the sensing information of the corrected line pieces to the receiver. Or the receiver receives the sensing information of the line pieces, and then corrects the gradient of the sensing information of the line pieces.

Besides, the invention further discloses a touch sensitive information transmission system, comprising a transmitter, a receiver, and a consumer. Please refer to FIG. 3B, a flow chart for the transmitter, receiver, and consumer in one embodiment in accordance with the present invention is illustrated. As shown in FIG. 3A, in steps 310A and 310B, the transmitter can transmit the touch sensitive information of the touch panel/screen 100 during some period. When the receiver receives the sensitive information, the transforming steps 320A and 320B are processed. The transforming steps 320A and 320B are used to transform the received touch sensitive information to another format for the consumer.

The abovementioned consumer could be operation system or application program. In one embodiment, the consumer receives the sensitive information with the proximity event as unit. For instance, the sensitive information of the proximity event received by the consumer includes X axis, Y axis, the width W of the proximity event, and the height H of the proximity event. It is important to note that the information of the abovementioned X axis, Y axis, the width W, and the height H relates to the resolution of the touch panel/screen 100. When the resolution changes, such as from 1280×1024 to 1024×768, the parameters mentioned above are changed as well.

In other words, no matter the receiver receives the sensitive information of each line piece by any format mentioned above, the sensitive information is processed by transforming steps 320A and 320B, and then being transmitted to the consumer by steps 330A and 330B, respectively.

Figure 3B:
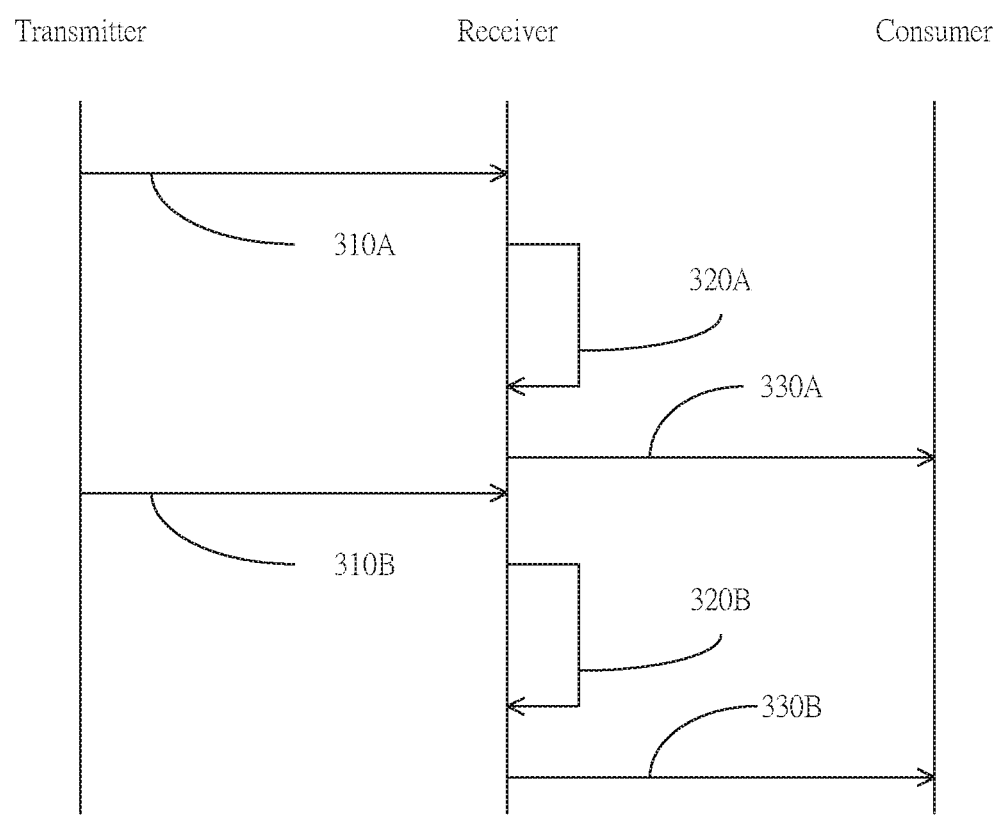
FIG. 3B depicts a diagram of a touch sensitive information transmission system in accordance with an embodiment of the present application.

Although only one receiver and one consumer are shown in FIGS. 3A and 3B, the present invention does not limit to one receiver and one customer, several receivers and customers are allowed.

Besides, each step 310 is related to each step 330 in FIGS. 3A and 3B, but the present invention does not limit to one to one relation. The receiver could meet the needs of the consumer to adjust the relation of steps 330 and 310. For example, the receiver can receive two times step 310 and execute one time step 330. Also, steps 310 and 330 may not have the relation of synchronization as well.

The topic of the present invention could contain the abovementioned transmitter, receiver, consumer, and whole system.

In addition, the transmitter could execute the procedures of grouping the line pieces and correcting the gradient, and then transmit the sensing information to the receiver. Or the receiver could execute the procedures and then transmit the sensing information to the consumer. Or the consumer could receive the original sensing information to execute the procedures.

Figure 4:
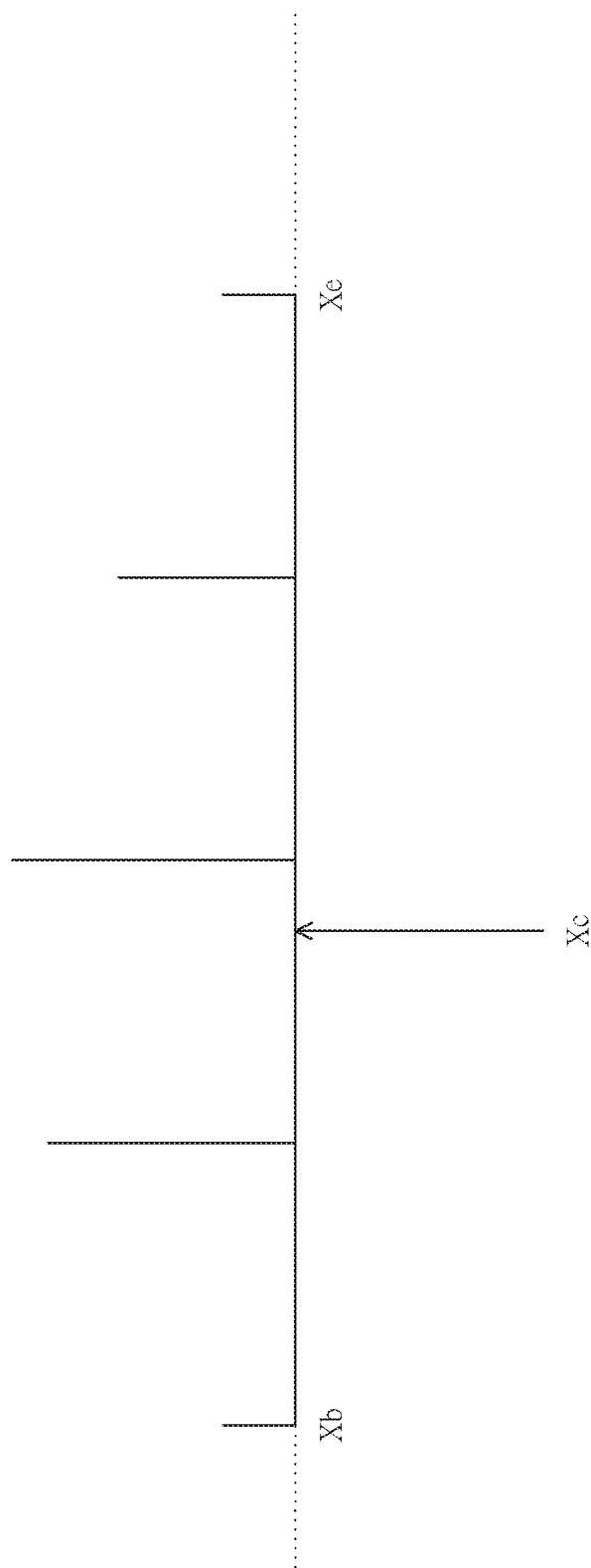
FIG. 4 depicts a diagram of a line piece detection in accordance with an embodiment of the present application.

Please refer to FIG. 4, the sensitive information of one line piece for one embodiment in accordance with the present invention is illustrated. In one embodiment, the sensitive information could include at least two parameters, one is the beginning point Xb of line piece and the other is the ending point Xe of line piece. In another embodiment, the sensitive information could further include a length of line piece. In another embodiment, the sensitive information could further include an electrode number to indicate the line piece is corresponding to which conductive strip.

In another embodiment, the sensitive information could include a centroid position Xc (or core position.) Since the signals on the line piece do not distribute uniformly, a weighted process according to the signals detected by each point could be carried on for finding the centroid position Xc.

In another embodiment, the sensitive information could further include the mass m of the line piece, that is, the total signals included by the line piece.

In another embodiment, the sensitive information could further include the signal values, the difference values, or dual-difference values of each point in the line piece.

In one embodiment, before transmitting each line piece corresponding to the proximity event 120, the proximity event number representing the proximity event 120 can be transmitted first, and then the sensitive information for each line piece is transmitted.

Accordingly, after receiving the sensing information of all line pieces of an approaching/touching event, the receiver can execute the corresponding procedures for the approaching/touching event immediately.

Figure 5A:
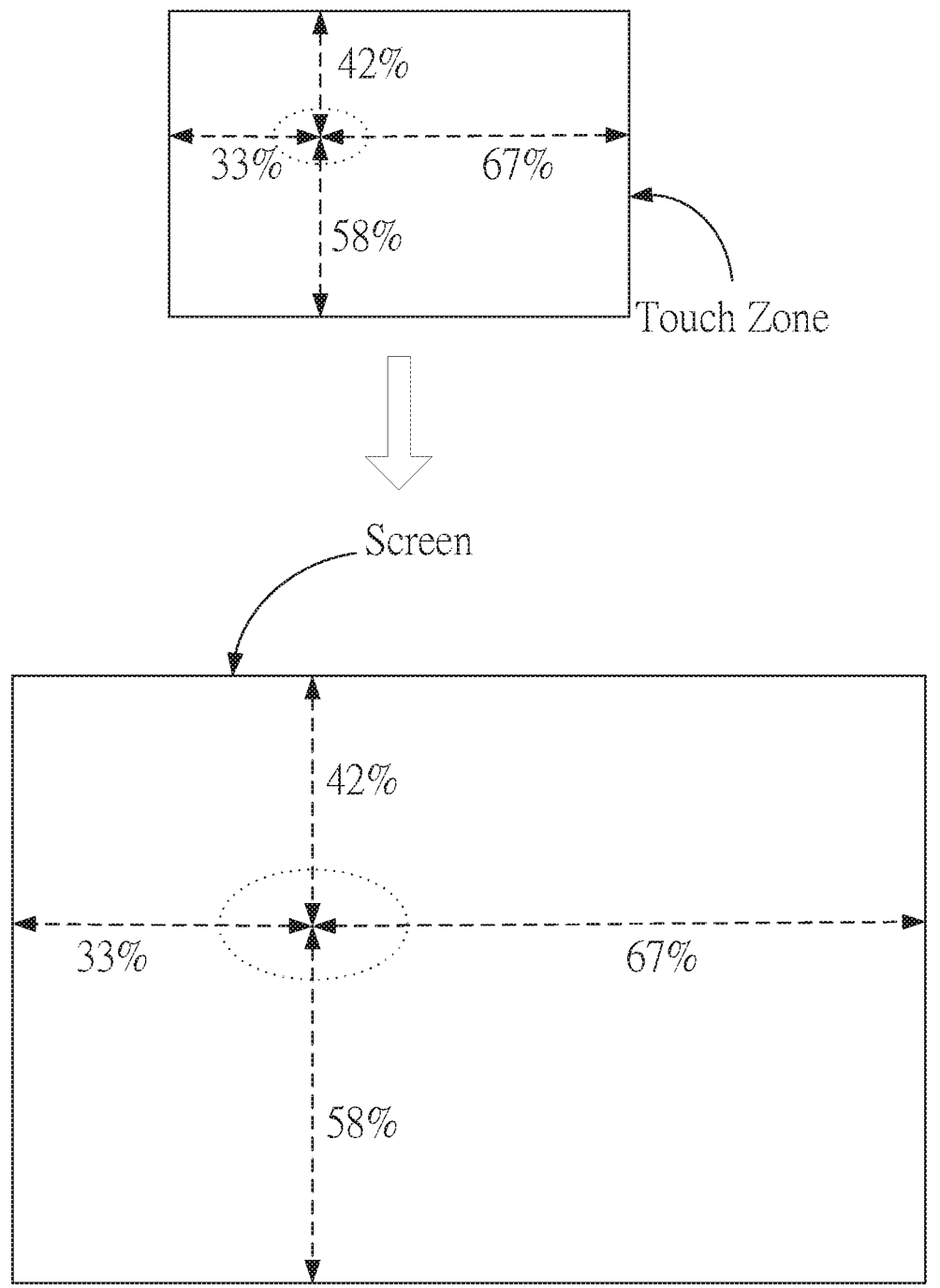
FIG. 5A depicts a diagram of an approaching/touching event in accordance with an embodiment of the present application.

In one embodiment, a touch zone of a laptop detects an approaching/touching event, and a screen of the laptop displays the approaching/touching event. However, the areas of the touch zone and the screen are different, and the aspect ratio of the touch zone and the screen could be different, either. Thus, the parameters included by the sensing information of the approaching/touching event could be transformed based on the ratio of the length between the approaching/touching event and the upper boundary of the screen to the length between the approaching/touching event and the lower boundary of the screen and based on the ratio of the length between the approaching/touching event and the left boundary of the screen to the length between the approaching/touching event and the right boundary of the screen, as shown in FIG. 5. The ratio of the length between the centroid of approaching/touching event and the upper boundary of the screen to the height of the screen is 42%, and the ratio of the length between the centroid of approaching/touching event and the lower boundary of the screen to the height of the screen is 58%. When the screen is displaying the approaching/touching event, the ratio of the length between the centroid of the displaying approaching/touching event and the upper boundary of the screen to the height of the screen should keep 42%, and the of the length between the centroid of the displaying approaching/touching event and the lower boundary of the screen to the height of the screen should keep 58%.

Likewise, the ratio of the length between the centroid of approaching/touching event and the left boundary of the screen to the width of the screen is 33%, and the ratio of the length between the centroid of approaching/touching event and the right boundary of the screen to the width of the screen is 67%. When the screen is displaying the approaching/touching event, the ratio of the length between the centroid of the displaying approaching/touching event and the left boundary of the screen to the width of the screen should keep 33%, and the of the length between the centroid of the displaying approaching/touching event and the right boundary of the screen to the width of the screen should keep 67%.

Figure 5B:
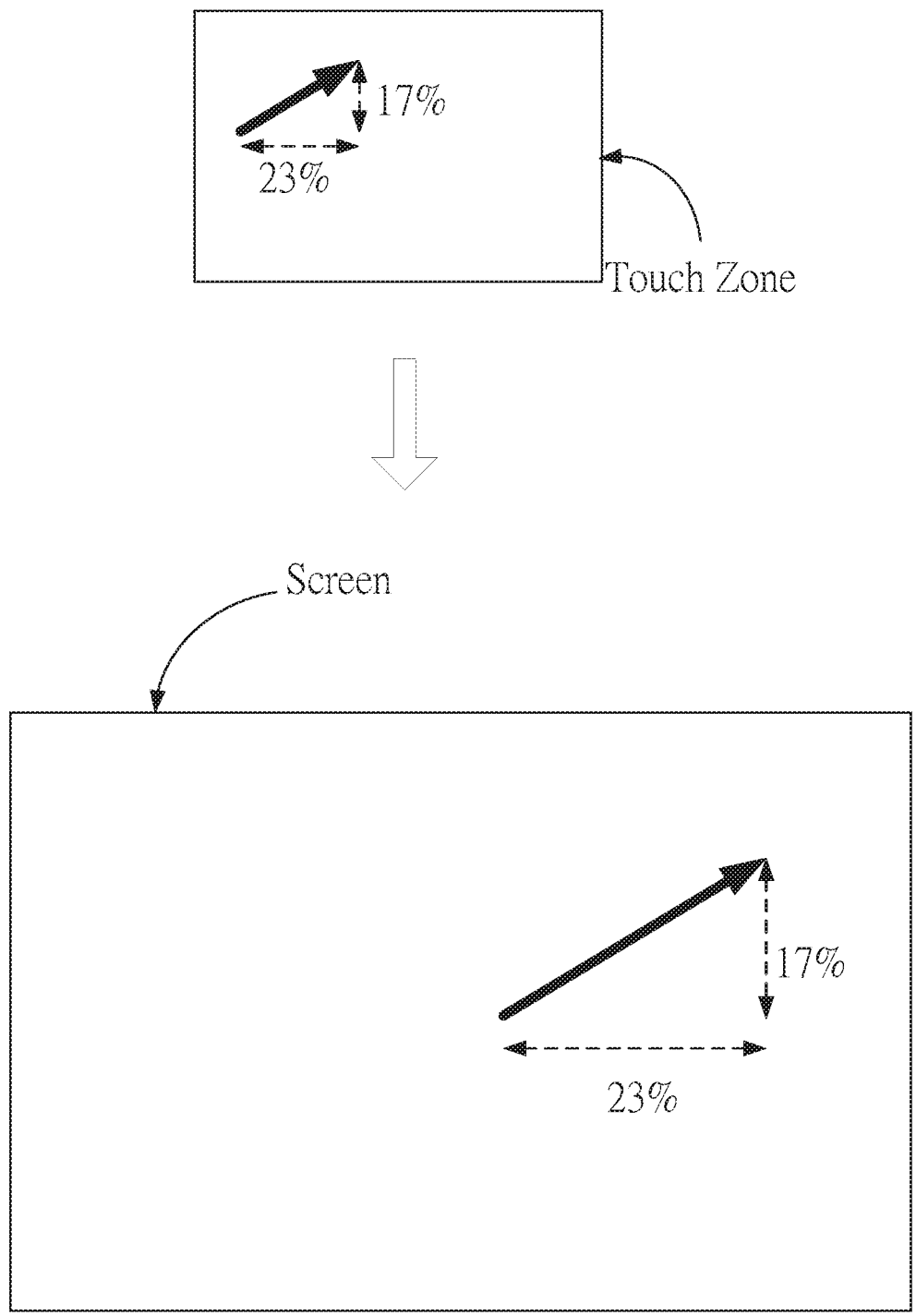
FIG. 5B depicts a diagram of a vector in accordance with an embodiment of the present application.

In another embodiment, the consumer receives the sensitive information with the vector as unit. For instance, when the approaching/touching event is moving, the touch zone will detect a vector. The sensing information of the vector could include the parameters of a direction, a length and so on, as shown in FIG. 5B. When the screen displays the vector, no matter where is the beginning point of the vector, only the direction needs to be kept. The length of the vector is transformed based on aspect ratio of the touch zone to the screen. For example, if the ratio of the X-axial length of the vector to the X-axial length of the touch zone is 17%, the ratio of the X-axial length of the vector to the X-axial length of the screen should keep 17%. Similarly, if the ratio of the Y-axial length of the vector to the Y-axial length of the touch zone is 23%, the ratio of the Y-axial length of the vector to the Y-axial length of the screen should keep 23%.

In further another embodiment, a first touch panel/screen detects the approaching/touching event, and then transmits the sensing information of the approaching/touching event to a second touch panel/screen. However, the resolution of the first touch panel/screen is 1280×1024, and the resolution of the second touch panel/screen is 1024×768. Thus, although the resolution changes, such as from 1280×1024 to 1024×768, the ratio of the length between the centroid of approaching/touching event and each boundary of the first touch panel/screen to the corresponding length of the first panel/screen should be the same as the ratio of the length between the centroid of approaching/touching event and each boundary of the second touch panel/screen to the corresponding length of the second panel/screen. Similarly, when the first touch panel/screen detects a vector due to the movement of the approaching/touching event, the length of the vector should increase or decrease with the change of the resolution, but the direction displayed on the second touch panel/screen should keep the same.

Figure 6:
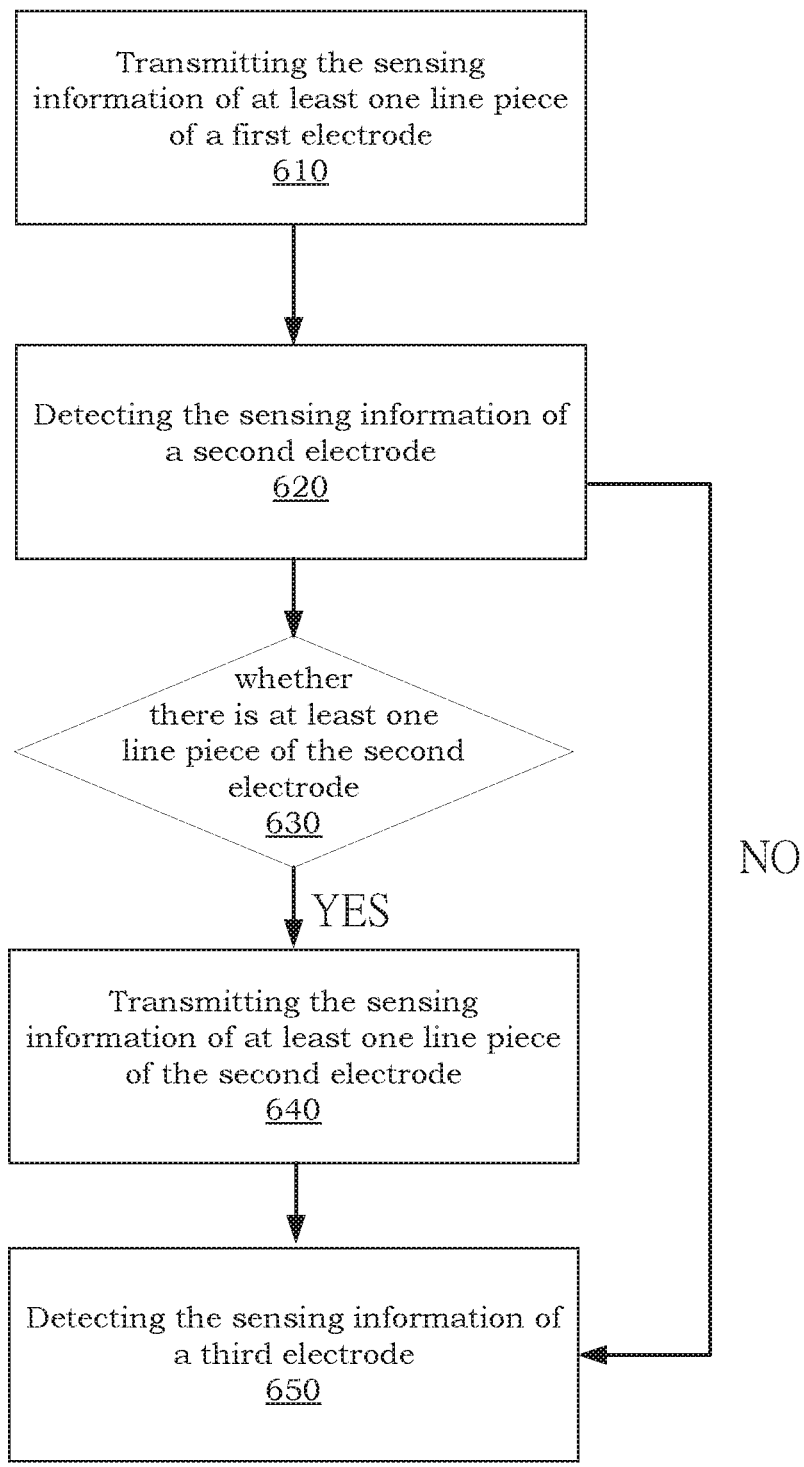
FIG. 6 depicts a flowchart diagram of determining a line piece in accordance with an embodiment of the present application.

Please refer to FIG. 6, a flow chart of a line piece detection for one embodiment in accordance with the present invention is illustrated. At first, in the step 610, the sensing information of at least one line piece of a first electrode is transmitted. In the step 620, the sensing information of a second electrode is detected. In the step 630, it is determined whether there is at least one line piece of the second electrode or not. In the step 640, the sensing information of at least one line piece of the second electrode is transmitted while the at least one line piece is determined based on the sensing information of the second electrode. Then, in the step 650, the sensing information of a third electrode is detected. While there is no line piece of the second electrode, the step 650 is executed directly. Then, repeat the above steps to detect all line piece of the touch panel/screen.

Figure 7:
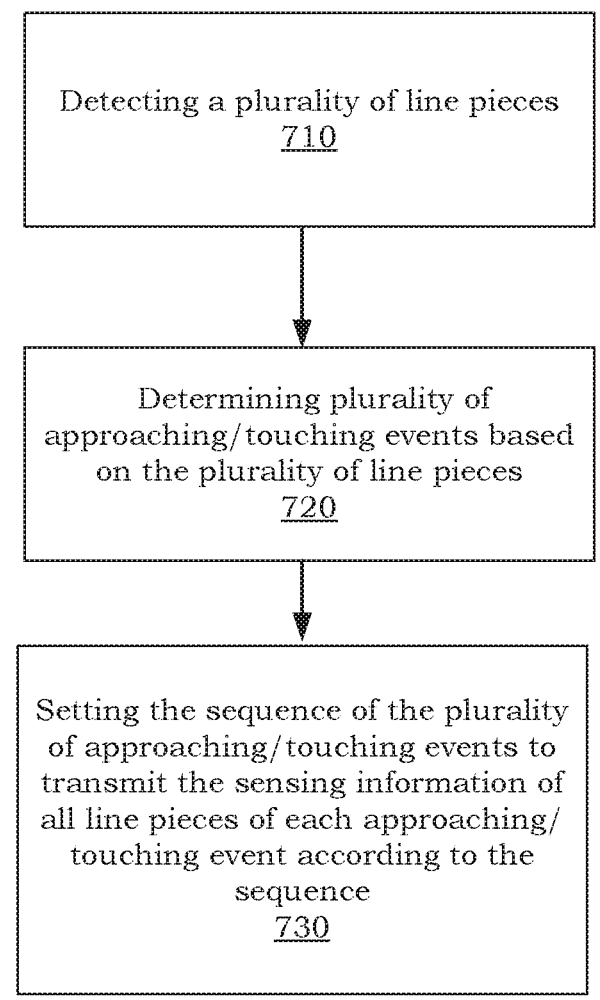
FIG. 7 depicts a flowchart diagram of determining a line piece in accordance with an embodiment of the present application.

Please refer to FIG. 7, a flow chart of a line piece detection for one embodiment in accordance with the present invention is illustrated. At first, in the step 710, a plurality of line pieces are detected. In the step 720, a plurality of approaching/touching events is determined based on the plurality of line pieces. In the step 730, the sequence of the plurality of approaching/touching events is set to transmit the sensing information of all line pieces of each approaching/touching event according to the sequence. Then, repeat the above steps to detect all line piece of the touch panel/screen.

One objective of the present application is to provide a touch sensitive information transmission method, comprising: transmitting the sensing information of at least one line piece of a first electrode; and detecting the sensing information of a second electrode.

One objective of the present application is to provide a touch sensitive information transmission processor, executing the following steps: transmitting the sensing information of at least one line piece of a first electrode; and detecting the sensing information of a second electrode.

In one embodiment, the method further comprises the step of detecting the at least one line piece based on the sensing information of the first electrode, wherein the detection of the at least one line piece of the first electrode comprises: driving the first electrode; detecting a plurality of sensing electrodes to obtain the sensing information of a sensing point of each sensing electrode corresponding to the first electrode, wherein the first electrode is perpendicular to each sensing electrode; and determining whether there is at least one line piece of the first electrode based on the sensing information of each sensing point of the first electrode.

In one embodiment, the sensing information of each line piece comprises at least one of the following parameters: beginning point of line piece, ending point of line piece, length of line piece, electrode number, signal of each sensing point of line piece, total signals included by the line piece and centroid position of line piece, wherein the signal of each sensing point of line piece comprises signal values, difference values, or dual-difference values.

In one embodiment, it is determined that there is at least one line piece of the first electrode while each of a plurality of continuous sensing points is with a non-zero value, wherein the length of the at least one line piece is the length of the plurality of continuous sensing points.

In one embodiment, the method further comprises: transmitting sensing information of at least one line piece of the second electrode while the at least one line piece is determined based on the sensing information of the second electrode; and detecting sensing information of a third electrode.

In one embodiment, the method further comprises the step of correcting the gradient of the sensing information of the at least one line piece.

In one embodiment, the method further comprises the step of determining one or more approaching/touching events corresponding to the at least one line piece of the first electrode and the at least one line piece of the second electrode, respectively.

In one embodiment, the sensing information of the first electrode excluding the sensing information of the at least one line piece is not transmitted.

One objective of the present application is to provide a touch sensitive information transmission method, comprising: detecting a plurality of line pieces; and transmitting a plurality of sensing information included by the plurality of line pieces according to a sequence.

One objective of the present application is to provide a touch sensitive information transmission processor, executing the following steps: detecting a plurality of line pieces; and transmitting a plurality of sensing information included by the plurality of line pieces according to a sequence.

In one embodiment, the plurality of line pieces are all or part of line pieces of a touch device.

In one embodiment, the step of transmitting the plurality of sensing information included by the plurality of line pieces according to the sequence further comprises: determining a plurality of approaching/touching events based on the plurality of line pieces; and setting the sequence of the plurality of approaching/touching events to transmit the sensing information of all line pieces of each approaching/touching event according to the sequence.

In one embodiment, the plurality of line pieces are detected based on the sensing information of each electrode, and the detection of the plurality of line pieces comprises: driving the electrode; detecting a plurality of sensing electrode to obtain the sensing information of a sensing point of each sensing electrode corresponding to the electrode, wherein the electrode is perpendicular to each sensing electrode; and determining whether there is at least one line piece of the electrode based on the sensing information of each sensing point of the electrode.

In one embodiment, it is determined that there is at least one line piece of the electrode while each of a plurality of continuous sensing points is with a non-zero value, wherein the length of the at least one line piece is the length of the plurality of continuous sensing points.

In one embodiment, the sensing information of each line piece comprises at least one of the following parameters: beginning point of line piece, ending point of line piece, length of line piece, electrode number, signal of each sensing point of line piece, total signals included by the line piece and centroid position of line piece, wherein the signal of each sensing point of line piece comprises signal values, difference values, or dual-difference values.

In one embodiment, the processor further executes the step of correcting the gradient of the sensing information of each line piece.

In one embodiment, the processor further executes the step of correcting the gradient of the sensing information of each line piece before transmitting the sensing information of the line piece.

In one embodiment, the sensing information excluding the sensing information of at least one of the plurality of line pieces is not transmitted.

One objective of the present application is to provide a touch sensitive information transmission system, comprising: a transmitter, detecting and transmitting sensing information of at least one line piece; and a receiver, receiving the sensing information of the at least one line piece.

In one embodiment, the transmitter comprises a hardware, a firmware, or a driver program to detect the at least one line piece, and the receiver comprises an application program, an operation system, or a driver program.

In one embodiment, the transmitter determines one or more approaching/touching events corresponding to all or part of line pieces to transmit the sensing information of all line pieces of at least one approaching/touching event to the receiver while the transmitter detects all or part of line pieces of a touch device.

In one embodiment, the transmitter corrects the gradient of the sensing information of the at least one line piece to transmit the sensing information of the corrected line piece to the receiver while the transmitter detects the at least one line piece.

In one embodiment, the receiver determines one or more approaching/touching events corresponding to all or part of line pieces while the receiver receives all or part of line pieces of a touch device.

In one embodiment, the receiver corrects the gradient of the sensing information of the at least one line piece while the receiver receives the sensing information of the at least one line piece.

In one embodiment, the system further comprises a consumer for receiving the sensing information of the at least one line piece from the receiver, wherein after the receiver transforms at least one parameter of the sensing information of the at least one line piece to another format for the consumer, the receiver outputs the transformed sensing information of the at least one line piece, wherein the consumer comprises an application program or an operation system.

In one embodiment, the system further comprises a touch device and a display device, wherein the touch device comprises the transmitter for detecting at least one approaching/touching event, and the display device displays the at least one approaching/touching event, wherein when the receiver transforms at least one parameter of the sensing information of all line pieces of the at least one approaching/touching event to another format, the receiver maintains the length ratio of the boundary of the touch device to the at least one approaching/touching event and the length ratio of the boundary of the display device to the at least one approaching/touching event displayed by the display device.

In one embodiment, the system further comprises a touch device and a display device, wherein the touch device comprises the transmitter for detecting at least one approaching/touching event, and while the approaching/touching event is moving, the transmitter detects a vector based on the movement of the approaching/touching event, wherein the vector comprises a direction and a length, and the display device displays the vector, wherein while the receiver transforms at least one parameter of the vector to another format for the consumer, the direction is maintained, but the length is zoomed in or zoomed out based on the area ratio of the touch device to the display device.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive information transmission method, comprising:
   correcting a gradient phenomenon of at least one line piece of a first electrode to filter noises;
   transmitting the sensing information of the at least one line piece, wherein the at least one line piece includes a plurality of signal values accumulated from a plurality of difference values with the noises, the plurality of signal values has the gradient phenomenon with regard to the accumulated noises; and
   detecting the sensing information of a second electrode while the transmitting step is being executed simultaneously.

2. The touch sensitive information transmission method of claim 1, further comprising the step of detecting the at least one line piece based on the sensing information of the first electrode, wherein the detecting of the at least one line piece of the first electrode comprises:
   driving the first electrode;
   detecting a plurality of sensing electrodes to obtain the sensing information of a sensing point of each sensing electrode corresponding to the first electrode, wherein the first electrode is perpendicular to each sensing electrode; and
   determining whether there is at least one line piece of the first electrode based on the sensing information of each sensing point of the first electrode.

3. The touch sensitive information transmission method of claim 2, wherein the sensing information of each line piece comprises at least one of the following parameters: beginning point of line piece, ending point of line piece, length of line piece, electrode number, signal of each sensing point of line piece, total signals included by the line piece and centroid position of line piece, wherein the signal of each sensing point of line piece comprises signal values, difference values, or dual-difference values.

4. The touch sensitive information transmission method of claim 2, wherein it is determined that there is at least one line piece of the first electrode while each of a plurality of continuous sensing points is with a non-zero value, wherein the length of the at least one line piece is the length of the plurality of continuous sensing points.

5. The touch sensitive information transmission method of claim 1, further comprising:
   transmitting sensing information of at least one line piece of the second electrode while the at least one line piece is determined based on the sensing information of the second electrode; and
   detecting sensing information of a third electrode.

6. The touch sensitive information transmission method of claim 5, further comprising the step of determining one or more approaching/touching events corresponding to the at least one line piece of the first electrode and the at least one line piece of the second electrode, respectively.

7. The touch sensitive information transmission method of claim 1, wherein the sensing information of the first electrode excluding the sensing information of the at least one line piece is not transmitted.

8. A touch sensitive information transmission processor, executing the following steps:
   correcting a gradient phenomenon of at least one line piece of a first electrode to filter noises;
   transmitting the sensing information of the at least one line piece, wherein the at least one line piece includes a plurality of signal values accumulated from a plurality of difference values with the noises, the plurality of signal values has the gradient phenomenon with regard to the accumulated noises; and
   detecting the sensing information of a second electrode while the transmitting step is being executed simultaneously.

9. The touch sensitive information transmission processor of claim 8, further comprising the step of detecting the at least one line piece based on the sensing information of the first electrode, wherein the detection of the at least one line piece of the first electrode comprises:
   driving the first electrode; detecting a plurality of sensing electrodes to obtain the sensing information of a sensing point of each sensing electrode corresponding to the first electrode, wherein the first electrode is perpendicular to each sensing electrode; and
   determining whether there is at least one line piece of the first electrode based on the sensing information of each sensing point of the first electrode.

10. The touch sensitive information transmission processor of claim 9, wherein the sensing information of each line piece comprises at least one of the following parameters: beginning point of line piece, ending point of line piece, length of line piece, electrode number, signal of each sensing point of line piece, total signals included by the line piece and centroid position of line piece, wherein the signal of each sensing point of line piece comprises signal values, difference values, or dual-difference values.

11. The touch sensitive information transmission processor of claim 9, wherein it is determined that there is at least one line piece of the first electrode while each of a plurality of continuous sensing points is with a non-zero value, wherein the length of the at least one line piece is the length of the plurality of continuous sensing points.

12. The touch sensitive information transmission processor of claim 8, further comprising:
   transmitting sensing information of at least one line piece of the second electrode while the at least one line piece is determined based on the sensing information of the second electrode; and
   detecting sensing information of a third electrode.

13. The touch sensitive information transmission processor of claim 12, further comprising the step of determining one or more approaching/touching events corresponding to the at least one line piece of the first electrode and the at least one line piece of the second electrode, respectively.

14. The touch sensitive information transmission processor of claim 8, wherein the sensing information of the first electrode excluding the sensing information of the at least one line piece is not transmitted.

* * * * *